(12) United States Patent
Sasa

(10) Patent No.: US 6,677,025 B2
(45) Date of Patent: Jan. 13, 2004

(54) MOLD RELEASABLE COMPOSITE MATERIAL FOR WET PRODUCTION OF POLYURETHANE RESIN SYNTHETIC LEATHER

(75) Inventor: Hideo Sasa, Toda (JP)

(73) Assignees: Sanyo Kakoshi Kabushiki Kaisha, Toda (JP); Hofa Trading Company, Taipei (TW)

(*) Notice: Subject to any disclaimer, the term of this patent is extended or adjusted under 35 U.S.C. 154(b) by 120 days.

(21) Appl. No.: 09/833,732

(22) Filed: Apr. 13, 2001

(65) Prior Publication Data

US 2002/0022106 A1 Feb. 21, 2002

(30) Foreign Application Priority Data

Apr. 28, 2000 (JP) .......................... 2000-129787

(51) Int. Cl.$^7$ .......................... B32B 27/04; D03D 27/00
(52) U.S. Cl. .......................... 428/96; 428/904; 442/124; 156/219
(58) Field of Search .......................... 442/124; 456/219; 428/904

(56) References Cited

U.S. PATENT DOCUMENTS

| | | | |
|---|---|---|---|
| 3,684,348 A | * | 8/1972 | Rowland |
| 6,040,047 A | | 3/2000 | Yamashita |
| 6,326,072 B1 | * | 12/2001 | Ojeda et al. ............... 428/40.1 |

FOREIGN PATENT DOCUMENTS

| | | | |
|---|---|---|---|
| DE | 199 34 224 | 1/2000 | |
| EP | 0 570 932 | 11/1993 | |
| JP | 05263060 A | * 3/1992 | .......... C09J/175/04 |

OTHER PUBLICATIONS (Alger, Mark), 1997, Chapman & Hall, 2$^{nd}$ Edition, pp. 545,546,551).*

* cited by examiner

Primary Examiner—Glenn Caldarola
Assistant Examiner—Alexis Wachtel
(74) Attorney, Agent, or Firm—Oblon, Spivak, McClelland, Maier & Neustadt, P.C.

(57) ABSTRACT

A mold releasable composite material for wet production of a polyurethane resin synthetic leather is disclosed, comprising of a polymer base and a composition layer laminated on at least one surface of the polymer base, the composition layer consisting of 50 to 95% by weight of a styrenic polymer having a syndiotactic structure and 5 to 50% by weight of a polyolefin, the mold releasable composite material having a peeling strength of 300 g/15 mm or more, preferably, the composition layer being subjected to embossing processing, and an anchor coating agent being used in laminating of the composition layer on the polymer base, which overcomes the defects involved in the conventional production process of a polyurethane resin synthetic leather in a wet process which has such an advantage that a synthetic leather having a good breathability and a soft feeling is obtained.

3 Claims, 3 Drawing Sheets

[Fig. 1]
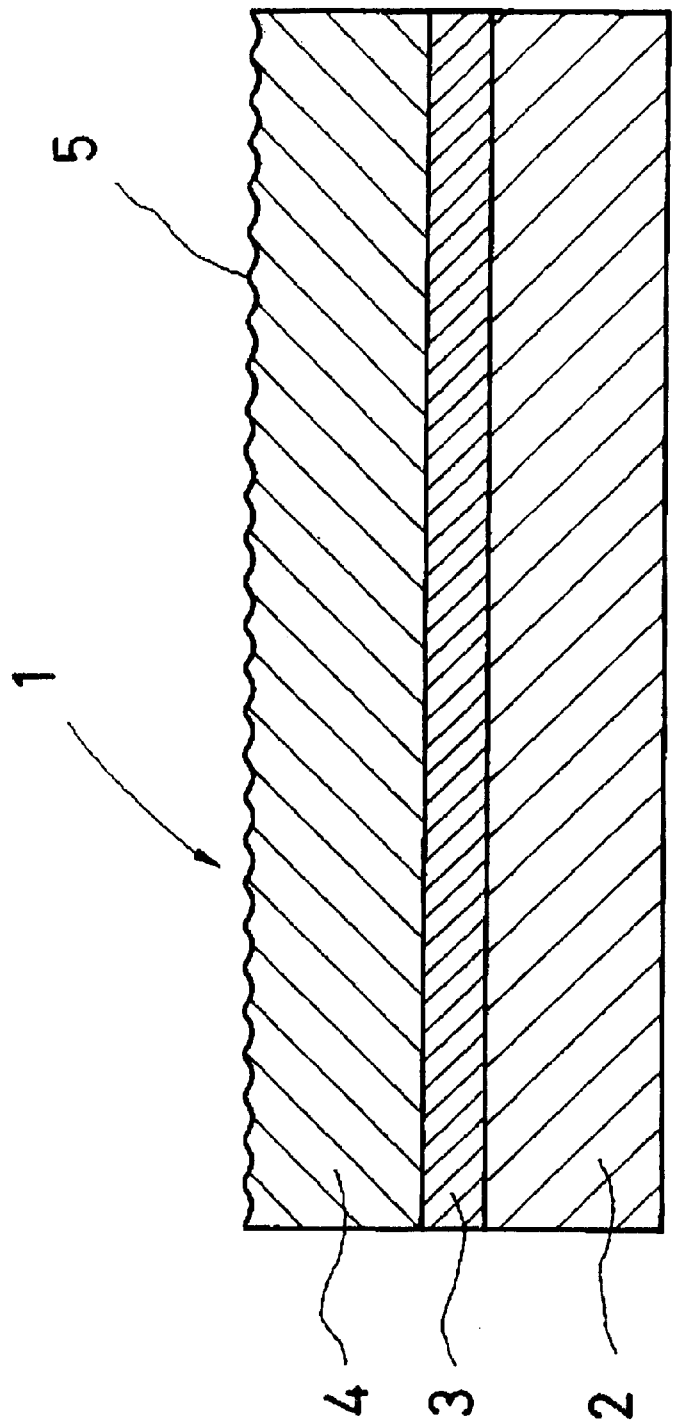

[Fig. 2]
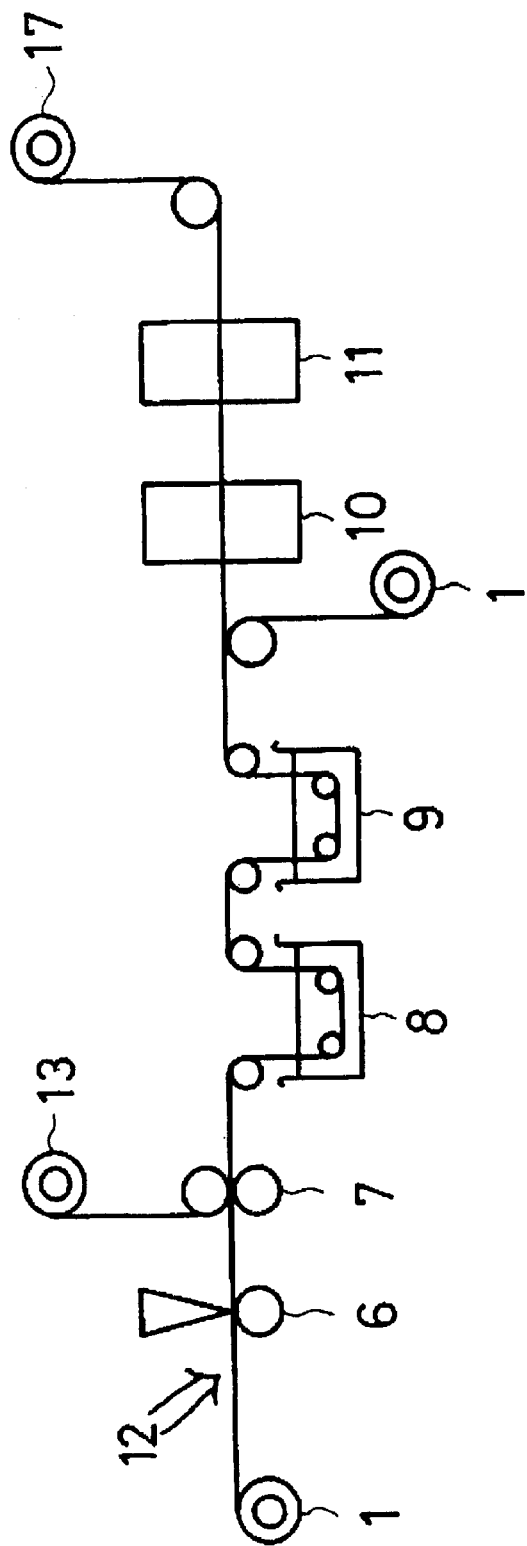

[Fig. 3]
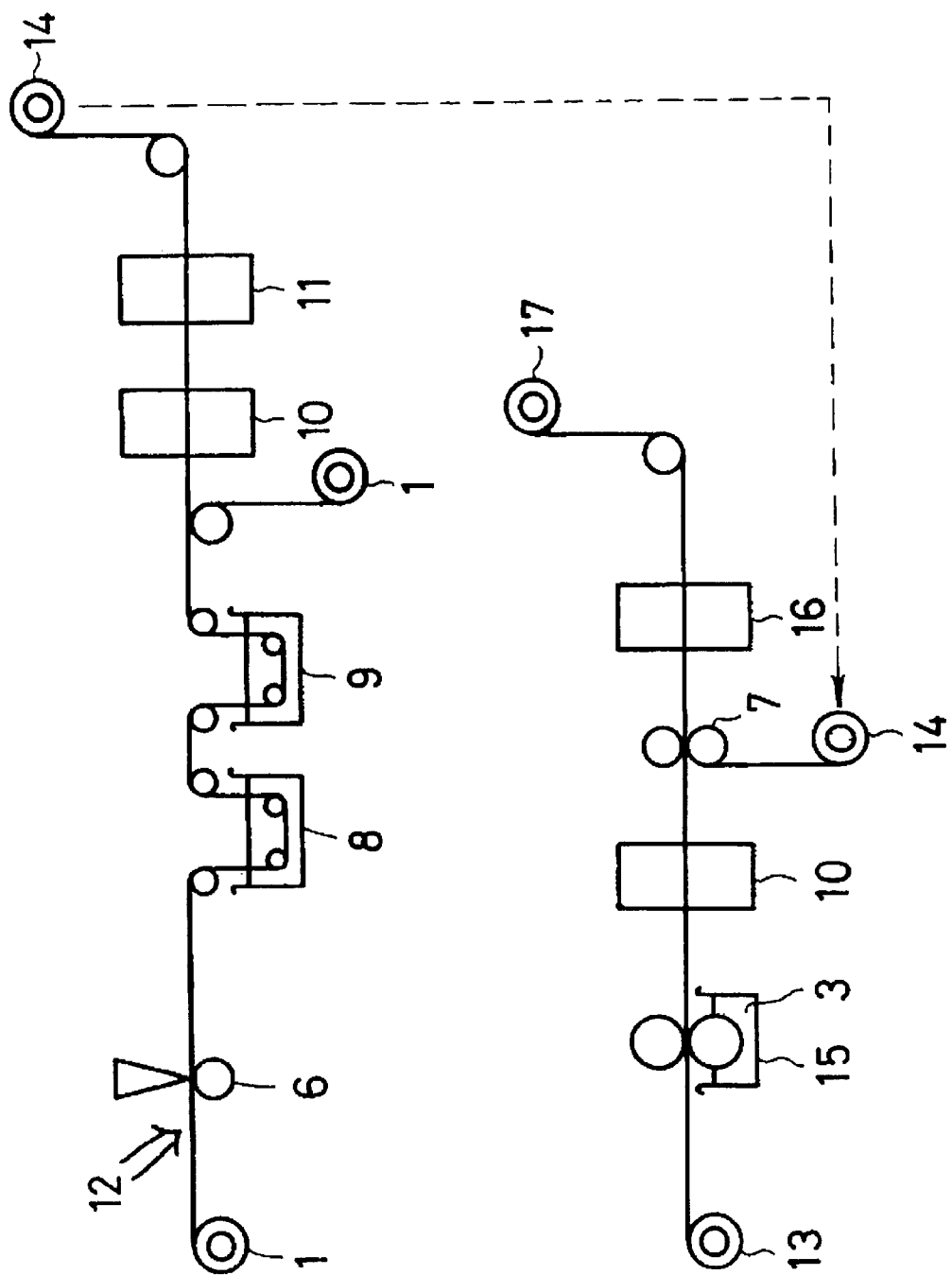

MOLD RELEASABLE COMPOSITE MATERIAL FOR WET PRODUCTION OF POLYURETHANE RESIN SYNTHETIC LEATHER

BACKGROUND OF THE INVENTION

1. Field of the Invention

The present invention relates to a mold releasable composite material that is used during the production of a polyurethane resin synthetic leather in a wet process.

2. Description of the Conventional Art

A synthetic leather is a terminology against a natural leather and generally refers to one comprising a substrate as a backing member, such as non-woven fabrics, woven fabrics, knitted fabrics or sheets, having a polyurethane resin layer, from which a solvent in a resin solution has been removed, lined thereon. Its production process is classified into a dry process and a wet process.

The dry process is a process in which the removal of a solvent in a polyurethane resin solution is effected upon evaporation by heat, thereby producing a polyurethane resin synthetic leather. On the other hand, the wet process is a process in which a solvent in a polyurethane resin solution is extracted in water and dried, thereby producing a synthetic leather. In the dry process, in general, a polyurethane resin solution is applied onto a processing paper comprising a base paper having a mold releasable resin layer provided thereon, at the side of the releasable resin layer and dried by heat to complete a polyurethane resin coating layer; a substrate such as fabrics is joined onto the polyurethane resin coating layer via an applied polyurethane adhesive by means of contact bonding by rollers, etc.; and then, the processing paper is peeled apart to produce a polyurethane resin synthetic leather.

In the wet process, usually, a polyurethane resin solution is applied directly onto a substrate such as fabrics; the applied substrate is introduced into a solidifying tank to extract the solvent, and then washed with water and dried to form a solidified layer (wet process silver layer) of the polyurethane resin, which is rich in fine pores; and if desired, a post treatment is carried out to produce a polyurethane resin synthetic leather.

According to this wet process, in general, innumerable fine pores, from which the solvent has been removed by water extraction, are formed, and hence, the polyurethane resin coating layer becomes in a sponge-like state. Thus, the wet process has an advantage that, though the resulting polyurethane resin coating layer is thicker than that obtained by the dry process, a synthetic leather having a good breathability and a soft feeling is obtained. However, in the case where the substrate such as fabrics is made of a soft material such as tricot, since the substrate has wrinkles or is rich in stretchability, there are defects that it is very difficult to uniformly apply the polyurethane resin solution directly onto the substrate and that deformation occurs depending on the type of the substrate because it passes through water. Thus, it was impossible to produce a thin synthetic leather using a soft substrate.

In order to solve this problem, Japanese Patent No. 2,926,391 disclosed a process in which a polyurethane resin solution is applied onto a release-processed base, a wet process silver layer is formed in the usual wet process, the base is peeled apart to produce a wet process silver layer product, and a substrate is then joined onto the surface, where the base has been peeled apart, of the wet process silver layer product.

Specifically, this process is a process in which a base is subjected to release processing with a silicone-based or fluorocarbon-based water repellent; the release-processed base is applied with a polyurethane resin solution and made pass through a solidifying tank and a water washing tank to solidify the polyurethane resin solution, thereby forming a wet process silver layer; the base is peeled apart to produce a wet process silver layer product; and an adhesive is applied onto the surface, where the base has been peeled apart, of the wet process silver layer product, or an adhesive is applied onto a substrate such as fabrics, and after semidrying, the substrate is joined onto the wet process silver layer product, followed by post treatment such as embossing, printing and/or lamination, to produce a polyurethane resin synthetic leather. According to this process, since it is possible to produce the wet process silver layer product before joining the substrate by using a release-processed base having a strength to a certain extent, it has become possible to produce not only a thin product by joining a soft substrate such as tricot but also a product by joining even a substrate such as a split leather, which becomes unshaped upon being made pass through water, to the wet process silver layer product.

However, according to this process, since a part of the silicone-based or fluorocarbon-based water repellent used for subjecting the base to release processing is transferred to the surface, where the base has been peeled apart, of the wet process silver layer product, there was involved a defect that it is not possible to undergo successfully printing or lamination, or joining of the substrate such as fabrics, on the surface, where the base has been peeled apart, of the wet process silver layer product.

SUMMARY OF THE INVENTION

An object of the invention is to provide a mold releasable composite material to be used in producing a polyurethane resin synthetic leather in a wet process, that is capable of overcoming these defects of the conventional art processes, to which a soft substrate such as tricot can be joined, and which is free from any adverse influence in the case where a post treatment such as printing and/or lamination is carried out, or in the case where joining of a substrate such as fabrics is carried out.

The present inventor made extensive and intensive investigations in order to achieve such an object. As a result, it has been found that the object can be achieved by a mold releasable composite material for wet production of a synthetic leather comprising a polymer base and a composition layer laminated on at least one surface of the polymer base, the composition layer consisting of 50 to 95% by weight of a styrenic polymer having a syndiotactic structure and 5 to 50% by weight of a polyolefin, and the mold releasable composite material having a peeling strength of 300 g/15 mm or more.

In addition, the inventor has found that it is preferred that the composition layer consisting of a styrenic polymer having a syndiotactic structure and a polyolefin is subjected to embossing processing; that as the polymer base on which the composition layer consisting of a styrenic polymer having a syndiotactic structure and a polyolefin is laminated, a sheet, a woven fabric, a non-woven fabric, or a knitted fabric comprising at least one member selected from the group consisting of a polyester, polyethylene, polypropylene, a nylon, and an acrylic resin, each of which is a waterproof resin, is used; that the composition layer consisting of a styrenic polymer having a syndiotactic structure and a polyolefin has a crystallinity of less than 30% and a wetting index of 26 to 38; and that an anchor coating agent is used in laminating the above-described composition layer on the polymer base.

BRIEF DESCRIPTION OF THE DRAWINGS

FIG. 1 is an enlarged cross-sectional explanatory drawing to explain a structure of a mold releasable composite material for wet production of a polyurethane resin synthetic leather, having a composition layer laminated on one surface thereof, according to the present invention;

FIG. 2 is a drawing to show one embodiment of a process of steps for producing a polyurethane resin synthetic leather using a mold releasable composite material for wet production of a polyurethane resin synthetic leather, having the structure as shown in FIG. 1, according to the present invention; and FIG. 3 is a drawing to show another embodiment of a process of steps for producing a polyurethane resin synthetic leather using a mold releasable composite material for wet production of a polyurethane resin synthetic leather, having the structure as shown in FIG. 1, according to the present invention.

DESCRIPTION OF THE PREFERRED EMBODIMENTS

The mold releasable composite material for wet production of a polyurethane resin synthetic leather according to the present invention and its use processes will be explained hereunder in more detail with reference to the drawings.

A numeral 1 is a mold releasable composite material for wet production of a polyurethane resin synthetic leather according to the present invention, wherein a composition layer 4 consisting of 50 to 95% by weight of a styrenic polymer having a syndiotactic structure and 5 to 50% by weight of a polyolefin is laminated on at least one surface of a polymer base 2, and a peeling strength between the polymer base 2 and the composition layer 4 is 300 g/15 mm or more.

The polymer base 2 is required to have waterproof properties because the mold releasable composite material 1 for wet production of polyurethane resin synthetic leather according to the present invention goes through the step of introducing into a solidifying tank for extraction of the solvent, the step of water washing and the step of drying. Accordingly, as mold releasable composite material 1 for wet production of polyurethane resin synthetic leather according to the invention, it is preferable to use a sheet, a woven fabric, a non-woven fabric, or a knitted fabric comprising at least one member selected from the group consisting of a polyester, polyethylene, polypropylene, a nylon, and an acrylic resin.

The reasons why the composition layer 4 to be laminated on at least one surface of the polymer base 2 must consist of 50 to 95% by weight of a styrenic polymer having a syndiotactic structure and 5 to 50% by weight of a polyolefin are as follows. That is, the styrenic polymer having a syndiotactic structure is a polystyrene resin having a high crystallinity, wherein benzene rings in which a styrene monomer is polymerized by a special catalyst are regularly and alternately aligned, and is a plastic having heat resistance, chemical resistance and dimensional stability in addition to properties that conventional general-purpose polystyrene resins have, such as low specific gravity, good electrical characteristics, hydrolysis resistance, and good moldability. Further, the styrenic polymer having a syndiotactic structure has good peeling properties against a polyurethane resin and is free from the occurrence of a phenomenon wherein the resulting composition is transferred into the peeled polyurethane resin. However, the styrenic polymer having a syndiotactic structure is hard and brittle itself. Accordingly, in the case where the styrenic polymer having a syndiotactic structure is laminated alone on a base in place of use of a water repellent that has hitherto been used for the mold release, there was a problem that cracking occurs. Then, it has become clarified by the inventor that when the styrenic polymer having a syndiotactic structure is mixed with a polyolefin, the resulting composition has softness, is hardly cracked and is superior in flexibility, and moreover, is free from the occurrence of a phenomenon wherein the composition is transferred into the polyurethane resin.

Examples of the polyolefin include polyethylene, polypropylene, polybutene, and polypentene. When a mixing ratio of the polyolefin is less than 5% by weight, the improving effect of the styrenic polymer having a syndiotactic structure is not realized. On the other hand, when it exceeds 50% by weight, the solvent resistance and release properties as characteristics of the styrenic polymer having a syndiotactic structure are lost.

Further, the reason why the peeling strength between the polymer base 2 and the composition layer 4 is 300 g/15 mm or more is as follows. That is, it is to ensure that the peeling strength is higher than that between the composition layer 4 and the solidified polyurethane resin, whereby the polymer base 2 and the composition layer 4 do not peel apart from each other during peeling apart the solidified polyurethane resin from the composition layer 4.

It is preferable that the composition layer 4 consisting of the styrenic polymer having a syndiotactic structure and the polyolefin has a crystallinity of less than 30% and a wetting index of 26 to 38. When the crystallinity is 30% or more, a part of the composition layer may be possibly peeled apart in the solidifying tank during the wet production of a polyurethane resin synthetic leather. In order that the crystallinity of the composition layer 4 is less than 30% such can be achieved by quenching the composition from the molten state to 100° C. at a rate of 500° C./min. or more during the extrusion and lamination. Further, when the wetting index of the composition layer 4 is less than 26, a part of the composition layer may be possibly peeled apart in the solidifying tank during the wet production of a polyurethane resin synthetic leather, too. On the other hand, when it exceeds 38, the peeling properties from the polyurethane resin synthetic leather after the solidification, water washing and drying may be possibly insufficient. The wetting index is adjusted by the types of the styrenic polymer having a syndiotactic structure and the polyolefin as well as the composition thereof.

The crystallinity, the wetting index, and the peeling strength are measured in the following manners.

Crystallinity

The crystallinity is calculated in the following equation from an enthalpy at fusion ($\Delta Hf$) and an enthalpy at cool crystallization ($\Delta HTCC$), each of which is measured by temperature elevation of a film at a rate of 20° C./min. or more by means of a differential scanning thermometer.

$$\text{Crystallinity } (\%) = 100 \times (\Delta Hf - \Delta HTCC)/53 (J/g)$$

Wetting Index

The wetting index is measured in accordance with a method as defined in JIS K6768 (the wetting test method of polyethylene and polypropylene films) by using a wetting index standard solution made by Wako Pure Chemical Industries, Ltd.

Peeling Strength

The peeling strength is measured by T-type peeling at a peeling rate of 300 mm/min. at 25° C.

In order to laminate the composition layer 4 onto the polymer base 2, though a direct extrusion lamination method may be employed, it is preferable that an anchor coating agent 3 is applied and dried, followed by lamination of the composition layer 4. In this case, the lamination may be effected by any of dry lamination, extrusion lamination, and wet lamination.

In the case where the polymer base 2 is polypropylene that is poor in adhesion to other materials, suitable examples of the anchor coating agent 3 include a polyester urethane polyol/aromatic polyisocyanate-based polyurethane two-pack setting type anchor coating agent.

Further, in order to obtain a desired drape such as suede touch as the polyurethane resin synthetic leather, it is preferable that the composition layer 4 is subjected to embossing processing 5.

The mold releasable composite material 1 for wet production of a polyurethane resin synthetic leather according to the present invention preferably has a specific gravity in the range of from 0.7 to 1.5. When the specific gravity is less than 0.7, the resulting composite material is too light in weight so that the workability is poor. On the other hand, when it exceeds 1.5, the resulting composite material is too heavy in weight so that the works become difficult.

Next, the process for producing a polyurethane resin synthetic leather in a wet process by using the mold releasable composite material 1 for wet production of a polyurethane resin synthetic leather according to the present invention will be explained with reference to FIG. 2 and FIG. 3.

In FIG. 2, a polyurethane resin solution 12 such as a one-pack type dimethylformamide solution of polyurethane resin is applied onto the surface of the composition layer 4 of the mold releasable composite material 1 for wet production of a polyurethane resin synthetic leather according to the present invention, as delivered from a rolled-up state; the polyurethane resin solution 12 is controlled so as to have a predetermined thickness (for example, from about 20 to 500 μm) by means of a knife coater 6; the applied polyurethane resin solution 12 is laminated with a substrate 13 made of, for example, a tricot having a thickness of about 100 to 300 μm by using lamination rollers 7; thereafter, the laminate is first dipped in a solidifying tank 8 having a solidifying solution composed mainly of water accommodated therein, whereby the dimethylformamide (DMF) is extracted with water to solidify the polyurethane resin; the DMF is then completely removed in a water washing tank 9; the mold releasable composite material 1 for wet production of a polyurethane resin synthetic leather according to the present invention is peeled apart from the solidified polyurethane resin layer; the solidified polyurethane resin layer is dried by a dryer 10; and if desired, the solidified polyurethane resin layer is subjected to post treatment such as printing and/or lamination for adding a pattern and/or a hue in a post treatment device 11, whereby a polyurethane resin synthetic leather product 17 having the substrate 13 laminated thereon is completed.

In FIG. 3, the steps proceed in the same way as in FIG. 2, except that the lamination of the substrate 13 by the lamination rollers 7 is not carried out. That is, a polyurethane resin layer is formed on the mold releasable composite material 1 for wet production of a polyurethane resin synthetic leather according to the present invention; after passing through the solidifying tank 8 and the water washing tank 9, the mold releasable composite material 1 for wet production of a polyurethane resin synthetic leather according to the present invention is peeled apart from the solidified polyurethane resin layer; the solidified polyurethane resin layer is dried by the dryer 10; and if desired, the solidified polyurethane resin layer is subjected to post treatment such as printing and/or lamination for adding a pattern and/or a hue in the post treatment device 11, to obtain a wet process silver product 14 as an intermediate product. This wet process silver product 14 can be made as the polyurethane resin synthetic leather product 17 as it stands. However, in order to process it into the polyurethane resin synthetic leather product 17 having the substrate 13 laminated thereon, the anchor coating agent 3 is applied onto one surface of the delivered substrate 13 such as a split leather, from an anchor coating agent coater 15 and then semidried by the dryer 10; the surface on which the anchor coating agent 3 has been applied is contact bonded with the wet process silver layer surface, where the mold releasable composite material 1 for wet production of a polyurethane resin synthetic leather according to the present invention has been peeled apart, of the wet process silver layer product 14, by means of the lamination rollers 7; and the laminate is then crosslinked in a maturing chamber 16, thereby completing the polyurethane resin synthetic leather product 17 comprising the wet process silver layer product 14 and the substrate 13 laminated with each other.

In the mold releasable composite material 1 for wet production of a polyurethane resin synthetic leather according to the present invention, not only the base 2 is waterproof, but also the composition layer 4 having waterproof properties and superior release properties is laminated on the surface thereof. Accordingly, the mold releasable composite material 1 for wet production of a polyurethane resin synthetic leather according to the present invention is large in waterproof properties as a whole and high in strength, and thus, it can be used repeatedly.

According to the steps as shown in FIG. 2, the polyurethane resin synthetic leather product 17 having the substrate 13 laminated on the back surface thereof can be produced at a stroke. Further, according to the steps as shown in the upper half portion of FIG. 3, the wet process silver layer product 14 not having the substrate 13 laminated on the back surface thereof can also be produced. Accordingly, it is possible to produce a product comprising the wet process silver layer product 14 only, a product in which the back surfaces of the wet process silver layer products 14 are joined to each other, and the polyurethane resin synthetic leather product 17 having the substrate 13 laminated thereon, which has not been able to be produced in the conventional wet process.

EXAMPLE 1

Onto one surface of a polymer base made of a polypropylene sheet having a thickness of 0.13 mm was applied a polyester urethane polyol/aromatic polyisocyanate-based polyurethane two-pack setting type anchor coating agent made by Dainippon Ink and Chemicals, Inc. (a trade name: DIC Dry). Thereafter, a molten mixture of a composition consisting of 70% by weight of a styrenic polymer having a syndiotactic structure and 30% by weight of polyethylene was extruded from T die to make the thickness to 0.06 mm and laminated on the anchor coating agent (at a crystallinity and a wetting index of the composition layer of 25% and 30, respectively), to produce a mold releasable composite material for wet production of a polyurethane resin synthetic leather having a thickness of 0.21 mm and a basis weight in gram per square meter of 260 g/m². While it was tried to measure a peeling strength between the polypropylene sheet as the polymer base and the composition layer consisting of a styrenic polymer having a syndiotactic structure and polyethylene of this mold releasable composite material for wet production of a polyurethane resin synthetic leather, the peeling strength was too high, whereby the measurement could not be achieved.

Using this mold releasable composite material for wet production of a polyurethane resin synthetic leather, a polyurethane resin synthetic leather was subjected to wet production in the production steps as shown in FIG. 2. As a result, the peeling strength at the first time, between the polyurethane resin and the mold releasable composite material for wet production of a polyurethane resin synthetic leather in the wet production of a polyurethane resin synthetic leather, was 170 g/15 mm, whereas the peeling strengths at the second and subsequent times, between the polyurethane resin and the mold releasable composite material for wet production of a polyurethane resin synthetic leather in the wet production of a polyurethane resin synthetic leather, were values substantially close to zero. However, the polyurethane resin was never peeled apart from the mold releasable composite material for wet production of a polyurethane resin synthetic leather during the wet production of a polyurethane resin synthetic leather. Further, this mold releasable composite material for wet production of a polyurethane resin synthetic leather could be continuously used even after repeated use for 6 times or more.

EXAMPLE 2

Onto one surface of a polymer base made of a polypropylene sheet having a thickness of 0.13 mm the same as in Example 1 was applied an ethylene-based adhesive (a trade name: Rex Pearl) made by Japan Polyolefin Co., Ltd. as a binder. Thereafter, a molten mixture of a composition consisting of 70% by weight of a styrenic polymer having a syndiotactic structure and 30% by weight of polyethylene the same as in Example 1 was extruded from T die to make the thickness to 0.13 mm and laminated on the binder (at a crystallinity and a wetting index of the composition layer of 25% and 30, respectively) to produce a mold releasable composite material for wet production of a polyurethane resin synthetic leather having a thickness of 0.26 mm and a basis weight in gram per square meter of 304 g/m². A peeling strength between the polypropylene sheet as the polymer base and the styrenic polymer having a syndiotactic structure of the mold releasable composite material for wet production of a polyurethane resin synthetic leather was measured to be 250 g/15 mm.

Using this mold releasable composite material for wet production of a polyurethane resin synthetic leather, a polyurethane resin synthetic leather was subjected to wet production in the production steps as shown in FIG. 2. As a result, the peeling strength at the first time, between the polyurethane resin and the mold releasable composite material for wet production of a polyurethane resin synthetic leather in the wet production of a polyurethane resin synthetic leather, was 170 g/15 mm, whereas the peeling strengths at the second and subsequent times, between the polyurethane resin and the mold releasable composite material for wet production of a polyurethane resin synthetic leather in the wet production of a polyurethane resin synthetic leather, were value substantially close to zero. However, the polyurethane resin was never peeled apart from the mold releasable composite material for wet production of a polyurethane resin synthetic leather during the wet production of a polyurethane resin synthetic leather. But, this mold releasable composite material for wet production of a polyurethane resin synthetic leather could not be used after the use of 2 times because the polymer base and the composition layer were peeled apart from each other.

As described above in detail, the mold releasable composite material for wet production of a polyurethane resin synthetic leather according to the present invention can overcome the defects involved in the conventional production process of a polyurethane resin synthetic leather in a wet process, which has such an advantage that a synthetic leather having a good breathability and a soft feeling is obtained. That is, according to the present invention, even in the case where a substrate such as fabrics is made of a soft material such as tricot, or in the case where a substrate is made of a split leather which becomes unshaped upon being made pass through water, a wet process silver layer product is produced, and the substrate is joined to this wet process silver layer product, whereby a polyurethane resin synthetic leather can be produced. In addition, the present invention is free from a phenomenon that, as in the process disclosed in Japanese Patent No. 2,926,391, in a composition layer applied with a polyurethane resin solution, a part of a silicone-based or fluorocarbon-based water repellent used for subjecting a base to release processing is transferred to a surface, where the base has been removed, of a wet process silver layer product. Accordingly, the present invention has such an advantage that it is possible to undergo successfully printing or lamination, or joining of the substrate such as fabrics, on the surface, where the base has been removed, of the wet process silver layer product. Moreover, since the mold releasable composite material for wet production of a polyurethane resin synthetic leather according to the present invention can be used repeatedly several times, it is superior in economy and very large in industrial value.

While the invention has been described in detail and with reference to specific embodiments thereof, it will be apparent to one skilled in the art that various changes and modifications can be made therein without departing from the spirit and scope thereof.

What is claimed is:

1. A mold releasable composite material for wet production of a polyurethane resin synthetic leather comprising a polymer base, an intermediate layer comprising a polyester urethane polyol/aromatic polyisocyanate-based polyurethane and a composition layer laminated on the surface of the intermediate layer, the composition layer comprising 50 to 95% by weight of a styrenic polymer having a syndiotactic structure and 5 to 50% by weight of a polyolefin, wherein the mold releasable composite material has a peeling strength of 300 g/15 mm or more between the composition layer and the polymer base, wherein the polymer base is a sheet, a woven fabric, a non-woven fabric or a knitted fabric comprising at least one member selected from the group consisting of a polyester, polyethylene, a nylon, and an acrylic resin.

2. The composite material as claimed in claim 1, wherein the composition layer has a crystallinity of less than 30% and a wetting index of 26 to 38.

3. The composite material as claimed in claim 1 or 2 wherein the composition layer is subjected to embossing.

* * * * *